Figure 1:
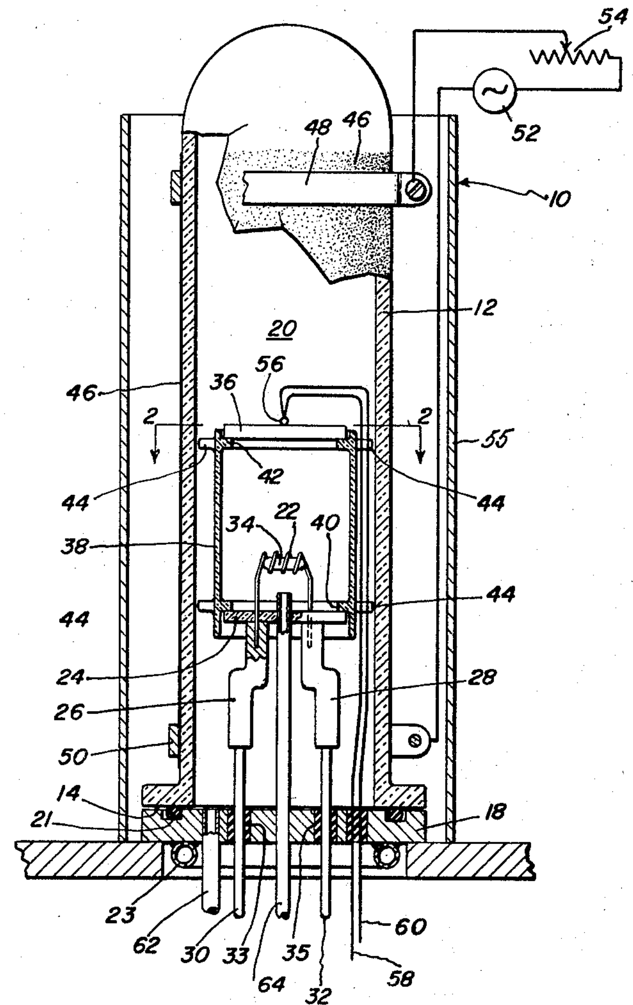

Aug. 9, 1960 L. R. KOLLER 2,948,635

PHOSPHOR EVAPORATION METHOD AND APPARATUS

Filed Jan. 12, 1959

Inventor:
Lewis R. Koller,
by John F. Ahern
His Attorney.

United States Patent Office 2,948,635
Patented Aug. 9, 1960

1

2,948,635

PHOSPHOR EVAPORATION METHOD AND APPARATUS

Lewis R. Koller, Schenectady, N.Y., assignor to General Electric Company, a corporation of New York Filed Jan. 12, 1959, Ser. No. 786,190
16 Claims. (Cl. 117—33.5)

This invention relates to an improved method of producing luminescent screens by the condensation of evaporated phosphors on a substrate.

Luminescent screens for cathode ray tubes, radar screens, television tubes and the like, may be produced by the application of phosphors to appropriate surfaces. Such phosphors may be those belonging to the zinc cadmium sulfoselenide family which includes zinc sulfide, zinc selenide, zinc sulfoselenide, zinc cadmium sulfide, zinc cadmium selenide, zinc cadmium sulfoselenide, cadmium sulfide, cadmium selenide, and cadmium sulfoselenide or any combination or mixtures thereof. For properly activating or coactivating these phosphors, each may contain materials such as silver or copper in activator quantities and one of the halogens in a coactivator quantity.

In applying such a phosphor to a substrate, for obtaining a good quality screen having high efficiency, it is desirable and important that the applied phosphor contain the proper amount of activator and coactivator materials. In conducting the evaporation deposition process, it is advantageous to have the substrate at an elevated temperature so that the vapors deposited thereon form desirable crystal films rather than amorphous compositions.

In accordance with heretofore known techniques for forming luminescent screens by the condensation of vapors on a screen substrate, difficulty frequently results from the relatively rapid re-evaporation from the hot substrate of coactivator materials having a relatively high vapor pressure. This rapid rate or re-evaporation of coactivators may result in loss of coactivator material in the finshed screen and in many cases may result in an inferior screen having reduced luminescent properties.

It is therefore a principal object of my invention to assure an adequate deposit of coactivator materials, especially those having a high vapor pressure, in the phosphor deposited on a substrate to form a screen.

It is another object of my invention to produce improved luminescent screens.

It is still another object of my invention to provide an improved evaporating apparatus for facilitating vapor deposition of phosphors on a screen substrate.

In accordance with my invention, luminescent screens made of phosphors from the zinc cadmium sulfoselenide family are produced on a heated substrate exposed to a region within a container which is mounted centrally in a sealed enclosure. An evaporation and condensation of a suitable material from the zinc cadmium sulfoselenide family containing an activator and which may or may not contain any coactivator material is performed in the container and as a feature of my invention an adequate quantity of a gaseous halide coactivator material in the applied phosphors is assured by increasing the concentration of the coactivator in the proper proportion in the region of the substrate during phosphor deposition. Thus, any tendency of the more volatile coactivator materials to re-evaporate from the substrate

2 is lessened or the re-evaporated quantities are replaced. In the case of a chlorine coactivator, for example, the concentration of chlorine may be increased by maintaining permeated the region adjacent to the substrate with a dissociable chloride gas such as hydrogen chloride or by evaporating a suitable chloride salt in the region during evaporating of the phosphor. The concentration of chloride in the region adjacent to the substrate surface is accordingly increased whereby chlorine evaporating from the substrate is replenished. For use of phosphors having other halides as coactivators the respective hydrogen halide gases may be utilized in a manner similar to the hydrogen chloride gas herein described.

Figure 2:
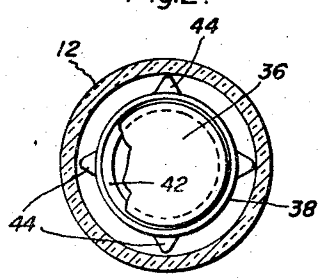

The novel features believed characteristic of the present invention are set forth in the appended claims. The invention itself together with further objects and advantages thereof may be thus understood with reference to the appended drawings in which:

Figs. 1 and 2 are elevational and plan cross-sectional views, respectively, showing an apparatus suitable for performing the method of this invention.

Referring now to the drawings, 10 represents generally the entire improved apparatus for performing the present invention and comprises a structure generally as set forth and claimed in my copending application, Serial No. 724,149, filed March 26, 1958, and assigned to the same assignee as the present invention. The apparatus includes a hollow bell jar 12 preferably of circular cross-section, closed at one end and engageable at its open end 14 with a sealing O-ring 21, mounted in a groove in a base 18 to provide a confined region 20 within the jar that may be isolated from ambient space. The region 20 within the jar accommodates further apparatus for performing the present invention and the base 18 is apertured to accommodate electrical connections and tubes leading to the region 20 for facilitating proper operation of the apparatus within the jar and hereinbelow more fully set forth. The O-ring 21 is made of rubber, plastic or other suitable resilient sealing material and to prevent the destruction thereof by excessive heat, it is maintained relatively cool by a coolant circulated in a cooling ring 23 which is preferably welded or soldered to base 18.

The apparatus within the bell jar 12 includes a suitable phosphor pellet evaporating structure which may be a helical resistance unit 22 with its end extending through a ceramic baffle 24 and having the ends conductively connected to respective conducting supporting members 26 and 28. The baffle 24 and unit 22 are supported by the supporting members 26 and 28 which are in turn supported by and connected to electrical conductors 30 and 32 passing through base 18. Insulators 33 and 35 surrounding portions of the conductors 30 and 32 insulate the same from base 18.

For confining the gases formed by a vaporized pellet 34 and exposing a substrate 36 to such gases, an evaporation enclosure 38, preferably circular and uniformly spaced from the walls of bell jar 12, is provided with an interior flange 40 near one end engageable with baffle 24 to support the enclosure and a further interior flange 42 near the other end for supporting substrate 36. The enclosure 38 may be quartz glass of sufficient thickness to provide the required strength under the circumstances and it may further be provided with a plurality of lobes as shown at 44 in Fig. 2 as well as in Fig. 1, for properly centering within the bell jar 12. Thus, the substrate 36 which may be a Pyrex disc approximately 2 inches in diameter and ⅛ inch thick, is exposed on one side to the interior of the evaporating enclosure 38. The exposed surface of substrate 36 may be coated with an oxide of tin or titanium in some cases.

To facilitate heating of the interior of the bell jar, a thin resistance coating 46 contacted with a pair of ring electrodes 48 and 50 is provided and connected to a source of electrical potential represented by an alternating current generator 52 and potentiometer 54, respectively. Resistance coating 46 serves as a heater when an electrical current is passed therethrough by means of spaced ring electrodes 48 and 50 and is the means by which substrate 36 is heated in accordance with the present invention. A suitable heat shield 55, telescopically fitting over the apparatus may be provided.

To control the heating of the substrate, the temperature thereof may be determined by a thermocouple 56 contacting a central surface portion thereof remote from the surface to be coated and wire connections 58 and 60 from the thermocouple lead to a suitable meter, not shown, to yield a temperature determination. The thermocouple 56 in the processes of this invention employing circulated hydrogen chloride gas is preferably of a platinum-rhodium composition while in other processes, other thermocouples useful at the temperatures involved may be used. The wire connections 58 and 60 extend through the base 18 and are suitably insulated therefrom.

The atmosphere in the bell jar 12 and evaporating enclosure 38 is conditioned for proper deposit of phosphor on the substrate 36 by evacuation and filling with proper gases. To facilitate these results, a conduit 62 establishes communication between the interior of the bell jar and a vacuum pump, not shown, for evacuation and for admitting gas within enclosure 38 according to one embodiment of this invention, a conduit 64 extends through base 18 and baffle 24 and establishes communication between the interior of enclosure 38 and a source of suitable gas, not shown.

Although the bell jar 12 may in certain instances comprise Pyrex, Vycor or other high temperature glasses, I preferably utilize quartz, therefore, since resistive layers which serve as the substrate heaters resist deterioration upon quartz surfaces at higher temperatures than they resist deterioration upon glass surfaces. The materials from which support members 26 and 28 are fabricated are not critical and may conveniently be tungsten, molybdenum, platinum or any other material conveniently utilized in this application. Resistance coating 46 upon the surface of bell jar 12 may conveniently be tin oxide formed by hydrolysis of tin tetrachloride. Alternatively, the coating 46 may be composed of titanium oxide formed by spraying titanium tetrachloride on the glass substrate in a moist atmosphere when heated to a temperature of approximately 150° C. to 250° C.

In performing the process of my invention, a suitable substrate 36 is disposed in bell jar 12 on the enclosure 38 and a pellet of suitable material which may be either an activated phosphor host material or a phosphor material, is disposed in helical heater 22. The apparatus is assembled as shown in Fig. 1 of the drawing and the interior of bell jar 12 is evacuated through conduit 62 to a very low value of the order of 1 micron of mercury and the entire apparatus is heated by resistance unit 46 to bring the entire apparatus including region 20 and substrate 36 to a temperature of 400° C. to 700° C. depending upon the particular materials used.

To assure the inclusion of coactivator material in the finished phosphor in coactivator quantities which are usually from .01 percent to 1 percent of the deposited phosphor, according to a feature of my invention, the entire apparatus is heated until it reaches thermal equilibrium and a gas, having as one element thereof, the halide coactivator material of the phosphor being applied, is admitted into the bell jar through conduit 64 and circulated in the region of the substrate. The rate of circulation may be varied over rather wide limits, it being necessary only to prevent stagnation of the gas and to maintain the concentration of coactivator material in the region adjacent to the substrate sufficiently high to replenish that which is re-evaporated therefrom or which is absorbed by the deposited phosphor. When the deposited phosphor comprises an activated phosphor host material, a somewhat greater rate of circulation may be required. In the case wherein pellet 34 includes a chlorine coactivator, hydrogen chloride gas may be used and may be admitted and circulated at a rate sufficient to maintain the portion of region 20 adjacent to the substrate permeated with chlorine. In accordance with my invention, the rate of circulation may be varied from approximately 50 micron liters to approximately 2000 micron liters depending upon the volume of region 20, the size of evaporated pellet, etc. In the apparatus herein described and used for carrying out the present invention, rates of circulation of from approximtaely 650 to approximately 950 micron liters per minute are found to produce superior screens with an average value of 800 micron liters per minute having been found a convenient value in this range.

The phosphor pellet is evaporated by passing electrical current through helical resistance unit 22 and in the embodiments of the invention herein set forth, the wire of unit 22 is of the order of 20 mils in diameter and such currents may be of the order of 12 amperes. A potential difference of approximately 6 volts appears across the helix producing a helix temperature of the order of 1775° C. The heat of the helix vaporizes the phosphor pellet and the vapor condenses on the surface of the substrate 36 exposed to the interior of the enclosure 38 and on the walls of the enclosure. However, the heat of the resistance 36 is effective to re-evaporate vapor depositing on the walls of the enclosure whereby its concentration in the enclosure remains high to increase the deposit on substrate 36. The hydrogen chloride circulated in the enclosure 38 is dissociable and in the region of the substrate 36, the chlorine of the gas replenishes any coactivator chlorine of the coactivated phosphor that evaporates from the substrate. The evaporation procedure is continued for a period of time sufficiently long to evaporate the pellet and to effect a deposit on the substrate the thickness required or desired in a particular circumstance. After the evaporation procedure is completed, electrical power supplied to resistance 46 is cut off and the entire apparatus is allowed to cool to a temperature of the order of approximately 200° C. while the supply of hydrogen chloride gas is maintained at a rate of approximately 800 micron liters per minute. Thereafter the supply of hydrogen chloride gas is terminated and the entire apparatus is allowed to cool to room temperature after which the substrate 36 is removed and is in the form of a completed luminescent screen.

In accordance with another embodiment of this invention, an adequate quantity of halide coactivator material in the finished phosphor screen is assured by increasing the concentration thereof in the region adjacent to the substrate 36 during the evaporation process by evaporating material containing a halide compound as well as evaporating the phosphor. In the case of a chlorine coactivator in a zinc sulfide phosphor, for example, and in the apparatus as shown in the drawing, in addition to evaporating the phosphor, a quantity of material containing chlorine as an element thereof, such as the chloride of the principle activator, for example, silver chloride, may be a part of the pellet evaporated and be contained in a mixture in the proper proportion therein. In carrying out the process according to this embodiment of the invention, the apparatus is set up and the conditions are made the same as hereinabove described with respect to the embodiments of invention utilizing the circulating hydrogen chloride gas. In this latter event, of course, no hydrogen chloride gas is circulated in the enclosure 30 but the pressure and concentration of chlorine is predetermined and maintained high by evaporating an appropriate quantity of a suitable chloride.

While the invention has been set forth hereinabove with respect to the general practice thereof, the following specific examples are given in order that those skilled in the art may determine specific circumstances under which the invention may be practiced. These examples are set forth in an exemplary manner only and are not to be construed in a limiting sense.

*Example 1.*—A two inch diameter disc of Pyrex glass, ⅛ inch thick and coated with tin oxide having a resistance of 30 ohms per square and a thickness of approximately 0.2 micron was prepared by polishing with "Precisionite" ($Al_2O_3$) abrasive compound, washed in distilled water and air dried. The substrate is then placed in the apparatus of Fig. 1 in the position of substrate 36. A 0.4 gram compressed pellet containing copper activated and chlorine coactivated zinc sulfide (0.015% by weight of copper and 0.015% by weight of chlorine) is inserted in helix 22. Bell jar 12 is vacuum sealed to the base 18 and evacuated to a pressure of approximately 1 micron of mercury. Electrical current is supplied to resistance 46 raising the temperature of the entire apparatus including substrate 36 to approximately 650° C. which takes a period of time of approximately 6 minutes. After maintaining this temperature for approximately 5 minutes to establish a state of thermal equilibrium, hydrogen chloride gas is admitted into the enclosure 38 through conduit 64 and is circulated therein at a rate of approximately 800 micron liters per minute. This raises the pressure within the enclosure and inside the bell jar 12 to approximately 10 microns of mercury. Current is then passed through heating helix 22 at a rate of approximately 12 amperes to evaporate the phosphor pellet 34 contained within the helix and the evaporating process is continued for a period of substantially 5 minutes after which the evaporating current and furnace power are cut off and the entire apparatus allowed to cool to a temperature of approximately 200° C. At the latter temperature the supply of hydrogen chloride gas admitted through conduit 64 is cut off and then the entire apparatus is allowed to cool to room temperature. This process results in a phosphor film coating on substrate 36 of approximately 3 microns thickness. When the substrate is mounted as a screen in a cathode ray tube it emits a green light under cathode ray bombardment. Under illumination by ultraviolet rays at 3650 A.U. the screen emits a green light. The screen is also electroluminescent if an additional electrode is put over the deposited zinc sulfide phosphor.

*Example 2.*—Example 2 was conducted following the same steps as in Example 1 except that the pellet placed in evaporation helix 22 contained .3 gram of zinc sulfoselenide phosphor activated with copper and coactivated with chlorine. After the process was completed, the substrate was removed and tested as in Example 1 and found to exhibit yellow green light under ultraviolet light at 3650 A.U. and a blue white light in response to cathode ray bombardment.

*Example 3.*—The apparatus of Fig. 1 was utilized again and the process carried out as before with the exception that the pellet 34 comprised .25 gram of zinc sulfide activated by 1 percent by weight of manganese and coactivated with 1 percent by weight of chlorine. The entire apparatus was heated to a temperature of 500° C. at a pressure of one micron of mercury for a period of 10 minutes. After an additional five minutes to allow the apparatus to reach thermal equilibrium, hydrogen chloride gas was introduced into enclosure 38 through conduit 64 and circulated at a rate of approximately 800 micron liters, after which the pressure within the apparatus was increased to approximately 9 microns of mercury. After approximately 5 minutes time duration, the evaporation of the pellet was carried out for a period of 4 minutes by passing 12 amperes through helical resistance 22, after which the current to heater 46 and the current to helix 22 was cut off and the entire apparatus allowed to cool to 200° C. The hydrogen chloride gas admitted through conduit 64 was then cut off and the entire apparatus allowed to cool to room temperature. This process produced a zinc sulfide phosphor activated by manganese and coactivated by chlorine on substrate 36, approximately 2.5 microns thick, which emitted a bright orange light in response to each of ultraviolet radiation at 3650 A.U. and cathode ray bombardment.

*Example 4.*—In this example, a two inch Pyrex glass substrate with no coating thereon was prepared by polishing one surface thereof with "Precisionite" ($Al_2O_3$) abrasive compound, washed in distilled water and air dried. The substrate was placed in position as shown in Fig. 1 of the drawings and a .25 gram zinc-cadmium sulfide phosphor activated by .01 percent silver and coactivated by chlorine was disposed in helical evaporating resistance 22 and the bell jar is vacuum sealed to the base 18. The bell jar is evacuated to a temperature of substantially 1 micron of mercury and electrical current is passed through resistance heater 46 raising the temperature of the entire apparatus to 700° C. in approximately 10 minutes time. After an additional 5 minutes to allow the apparatus to reach thermal equilibrium, hydrogen chloride gas was introduced through conduit 64 increasing the pressure within the bell jar to approximately 10 microns of mercury. After 5 minutes of circulation of hydrogen chloride gas, electrical current is passed through resistor 22 at a rate of 14 amperes and the pellet 34 is evaporated for a period of 4 minutes after which the current to the resistor and the current to resistance heater 46 are turned off and the entire apparatus is allowed to cool to 200° C. At this temperature, the circulation of hydrogen chlorine gas is terminated and the entire apparatus is allowed to cool to room temperature. The resultant screen produces red light in response to both cathode ray bombardment and ultraviolet radiation at 3650 A.U.

*Example 5.*—A two inch diameter ⅛ inch thick Pyrex glass substrate uncoated and prepared as in Example 4 is mounted on enclosure 38 in Fig. 1 of the drawings and a .25 gram pellet of luminescent grade, zinc sulfide, containing in admixture .01 percent by weight of silver chlorine compound, is disposed in evaporator helix 22. The bell jar is placed in position on base 18 to effect a vacuum seal therebetween and the interior of the bell jar is evacuated to a pressure of approximately .5 micron of mercury. The entire chamber is heated by heater 46 to a temperature of 700° C., taking a period of substantially 12 minutes time. After 10 minutes further time allowing the entire apparatus to reach thermal equilibrium, evaporation of the pellet is initiated by passing 12 amperes through the helix 22 and this evaporation is conducted for a period of 3 minutes during which time the vacuum of less than .5 micron is maintained. The current in heater 46 and helix 22 is interrupted and the entire apparatus is then allowed to cool to room temperature. The screen formed on substrate 36 was tested and found to emit a blue light in response to ultraviolet radiation at 3650 A.U. and in response to cathode ray bombardment.

While the invention has been described in accord with exemplary practices thereof it is immediately apparent that many modifications and changes will occur to those skilled in the art without departing from the invention.

For example, rather than utilizing the apparatus of the drawing, the process as disclosed herein may be performed within a cathode ray tube or similar device envelope to coat the faceplate thereof with a transparent luminescent screen. Accordingly, we intend by the appended claims to cover all such changes and modifications as fall within the true spirit and scope of the foregoing disclosure.

What I claim as new and desire to secure by Letters Patent of the United States is:

1. A method of producing a luminescent screen comprising the steps of heating a screen substrate to a temperature of from 400° C. to 700° C. in an enclosure having an atmosphere of hydrogen chloride gas, maintaining the walls of said enclosure at a temperature at least as great as the temperature of said substrate, evaporating in the region of said substrate a luminescent phosphor including a host material, an activator and a chlorine coactivator, said chlorine coactivator having a vapor pressure higher than that of said host material and said activator whereby said chlorine tends to re-evaporate from said heated substrate leaving the phosphor deposited thereon deficient in said coactivator and continuously replenishing and circulating hydrogen chloride gas in said enclosure to increase the concentration of chlorine in the region of said heated substrate and replenish the chlorine re-evaporated therefrom and assure the inclusion in said deposited phosphor of an adequate quantity of chlorine coactivator.

2. A method of producing a luminescent screen comprising the steps of heating a screen substrate to a temperature of from 400° C. to 700° C. within a sealed enclosure, maintaining the walls of said enclosure at a temperature of 400° C. to 700° C., evaporating a luminescent phosphor including a host material an activator and a chlorine coactivator within said enclosure in the region of said substrate, said chlorine coactivator having a vapor pressure higher than that of said host material and said activator whereby said chlorine tends to re-evaporate from said heated substrate leaving the phosphor deposited thereon deficient in said coactivator, circulating hydrogen chloride gas in said region during evaporation of the phosphor to increase the concentration of chlorine in the region of said heated substrate to replenish the chlorine re-evaporated therefrom and assure the inclusion in said deposited phosphor of an adequate quantity of chlorine coactivator and cooling the substrate and container to form a finished screen.

3. A method of producing a luminescent screen comprising the steps of heating a glass screen substrate to a temperature of 400° C. to 700° C. within a sealed enclosure, maintaining the walls of said enclosure at a temperature as great as the temperature of said substrate, evaporating a zinc sulfide phosphor activated with silver and coactivated with chlorine within said enclosure in the region of said substrate, circulating hydrogen chloride gas in said region and cooling the substrate and container to form a finished screen.

4. A method of producing a luminescent screen comprising the steps of heating a screen substrate to a temperature of 400° C. to 700° C. within a sealed enclosure, maintaining the walls of said enclosure at a temperature as great as the temperature of said substrate, evaporating a zinc sulfoselenide phosphor activated by copper and coactivated by chlorine within said enclosure in the region of said substrate, said evaporated phosphor condensing on said substrate, circulating hydrogen chloride gas at a rate of approximately 650 to 950 micron liters per minute, cooling said substrate in said enclosure to a temperature of the order of 200° C., terminating the circulation of said hydrogen chloride gas and cooling said substrate and enclosure to room temperature to form a finished screen on said substrate.

5. A method of producing a luminescent screen comprising the steps of heating a screen substrate to a temperature of 400° C. to 700° C. within a sealed enclosure, maintaining the walls of said enclosure at a temperature as great as the temperature of said substrate, evaporating a zinc sulfide luminescent phosphor within said enclosure in the region of said substrate, simultaneously evaporating a quantity of silver chloride within said enclosure in the region of said substrate, maintaining the pressure within said enclosure less than one-half micron of mercury during said evaporation, said evaporated phosphor condensing on said substrate, cooling said substrate in said enclosure to room temperature to provide a zinc sulfide phosphor activated with silver and coactivated with chlorine to form a finished luminescent screen.

6. A method of producing a luminescent screen comprising the steps of heating a screen substrate to a temperature of 400° C. to 700° C. within a sealed enclosure, maintaining the walls of said enclosure at a temperature as great as the temperature of said substrate, evaporating a manganese activated zinc sulfide phosphor coactivated with chlorine within said enclosure in the region of said substrate, said evaporated phosphor condensing on said substrate, establishing a rate of flow of hydrogen chloride gas in said region of the order of 650 to 950 micron liters per minute during said evaporation, cooling said film in said enclosure to a temperature of approximately 200° C., terminating circulation of said hydrogen chloride gas and cooling said substrate in said enclosure to room temperature to provide a luminescent screen.

7. A method of producing a luminescent screen comprising the steps of heating a screen substrate to a temperature of 400° C. to 700° C. within a sealed enclosure, maintaining the walls of said enclosure at a temperature as great as the temperature of the substrate, evaporating a zinc cadmium sulfide phosphor activated by silver and coactivated by chlorine within said enclosure in the region of said substrate, said evaporated phosphor condensing on said substrate, circulating hydrogen chloride gas in said region during said evaporation and at a rate of approximately 650 to 950 micron liters per minute, and cooling the substrate and container to form a finished luminescent screen.

8. A method of producing a luminescent screen comprising the steps of heating a tin oxide coated Pyrex glass screen substrate to a temperature of 400° C. to 700° C. within a sealed enclosure, simultaneously heating said enclosure to the temperature of said substrate, evaporating a zinc cadmium sulfide phosphor having a silver activator and chlorine coactivator in said enclosure in the region of said substrate, circulating hydrogen chloride gas in said region at a rate of approximately 650 to 950 micron liters, cooling said substrate and said container to a temperature of approximately 200° C. while maintaining said circulation of said hydrogen chloride gas, terminating said circulation and cooling said substrate and container to room temperature to produce a luminescent phosphor on said screen.

9. A method of producing a luminescent screen comprising the steps of heating a Pyrex glass screen substrate having a conducting oxide coating thereon to a temperature of 400° C. to 700° C., evaporating a zinc sulfide phosphor containing copper as an activator and chlorine as a coactivator within said enclosure in the region of said substrate, said evaporated phosphor condensing on said substrate, establishing a rate of flow of hydrogen chloride gas in said region of the order of 650 to 960 micron liters per minute, cooling said film in said enclosure to a temperature of approximately 200° C., terminating circulation of said hydrogen chloride gas and cooling said enclosure to room temperature.

10. A method of producing a luminescent screen having a zinc sulfide type phosphor comprising the steps of heating a screen substrate to a temperature of from 400° C. to 700° C. in an enclosure having an atmosphere of hydrogen chloride gas, maintaining said enclosure at a temperature of said substrate, evaporating a chlorine coactivated phosphor within said enclosure in the region of said substrate and continuously replenishing and circulating hydrogen chloride gas in the said region of the said substrate.

11. A method of producing a luminescent screen comprising the steps of heating a screen substrate to a temperature of from 400° C. to 700° C. in an enclosure having an atmosphere of a hydrogen halide gas, maintaining the walls of said enclosure at a temperature at least as great as the temperature of said substrate, evaporating a luminescent phosphor including a host material an activator and a halide coactivator within said enclosure in the region of said substrate, said halide coactivator having a vapor pressure higher than that of said host material and said activator whereby said halide tends to re-evaporate from said heated substrate leaving the phosphor deposited thereon deficient in said coactivator and continuously replenishing and circulating said hydrogen halide gas in the said region of said substrate to increase the concentration of said halide in the region of said heated substrate and replenish the halide re-evaporated therefrom and assure the inclusion in said deposited phosphor of an adequate quantity of halide coactivator.

12. A method of producing a luminescent screen comprising the steps of heating a screen substrate to a temperature of from 400° C. to 700° C. in an enclosure permeated with a dissociable halide gas, maintaining the walls of said enclosure at a temperature at least as great as the temperature of said substrate, evaporating a luminescent phosphor including a host material an activator and a halide coactivator within said enclosure in the region of said substrate, said halide coactivator having a vapor pressure higher than that of said host material and said activator whereby said halide tends to re-evaporate from said heated substrate leaving the phosphor deposited thereon deficient in said coactivator and continuously replenishing and circulating said dissociable gas in the said region of said substrate to increase the concentration of chlorine in the region of said heated substrate to replenish the halide re-evaporated therefrom and assure the inclusion in said deposited phosphor of an adequate quantity of halide coactivator.

13. A method of producing a luminescent screen comprising the steps of heating a screen substrate to a temperature of from 400° C. to 700° C. in an enclosure having an atmosphere of a dissociable halide gas, maintaining the walls of said enclosure at a temperature at least as great as the temperature of said substrate, evaporating a halide coactivated zinc sulfoselenide phosphor within said enclosure in the region of said substrate and continuously replenishing and circulating said hydrogen halide gas in the said region of said substrate.

14. A method of producing a luminescent screen comprising the steps of heating a screen substrate to a temperature of from 400° C. to 700° C. in an enclosure having an atmosphere of a dissociable halide gas, maintaining the walls of said enclosure at a temperature at least as great as the temperature of said substrate, evaporating a zinc cadmium sulfoselenide phosphor coactivated with said mentioned halide within said enclosure in the region of said substrate and continuously replenishing and circulating said dissociable halide gas in the said region of said substrate.

15. A method of producing a luminescent screen comprising the steps of heating a screen substrate to a temperature of from 400° C. to 700° C. in an enclosure containing an atmosphere of a dissociable halide gas, maintaining said enclosure at a temperature at least as great as the temperature of said substrate, evaporating an activated phosphor host material capable of being coactivated by said halide within said enclosure in the region of said substrate and selected from the group consisting of zinc sulfide, zinc selenide, zinc sulfoselenide, zinc cadmium sulfide, zinc cadmium selenide, zinc cadmium sulfoselenide, cadmium sulfide, cadmium selenide and cadmium sulfoselenide, said halide coactivator having a vapor pressure higher than that of said host material and said activator whereby said coactivator tends to re-evaporate from said heated substrate leaving the phosphor deposited thereon deficient in said coactivator and continuously replenishing and circulating said dissociable halide gas in the region of said substrate to increase the concentration of said halide in the region of said heated substrate and replenish the halide re-evaporated therefrom and assure the inclusion in said deposited phosphor of an adequate quantity of halide coactivator.

16. An apparatus for coating a substrate with a phosphor comprising a sealed envelope and means for elevating the temperature of the envelope to 400° C. to 700° C., a container mounted in said envelope and being uniformly spaced therefrom about its periphery, means for mounting a substrate on one end of said container, baffle means within said envelope and supporting said container at the other end thereof, said baffle and substrate engaging said container to inhibit free flow of gas from the interior of said container and means evaporating a suitable activated phosphor host material in said container and means for circulating a dissociable gas within said container and having as one element thereof material suitable for coactivating said phosphor.

References Cited in the file of this patent

UNITED STATES PATENTS

| | | |
|---|---|---|
| 2,379,057 | Anderson et al. | June 26, 1945 |
| 2,673,816 | Neuhaus et al. | Mar. 30, 1954 |
| 2,676,113 | Jervis | Apr. 20, 1954 |
| 2,691,601 | Butler et al. | Oct. 12, 1954 |